US011756281B1

(12) United States Patent
Casey

(10) Patent No.: US 11,756,281 B1
(45) Date of Patent: Sep. 12, 2023

(54) SYSTEMS AND METHODS FOR SPLAT FILLING A THREE-DIMENSIONAL IMAGE USING SEMI-MEASURED DATA

(71) Applicant: Illuscio, Inc., Culver City, CA (US)

(72) Inventor: Michael Brandon Casey, Humble, TX (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/183,735

(22) Filed: Mar. 14, 2023

(51) Int. Cl.
*G06T 19/20* (2011.01)
*G06T 7/73* (2017.01)
*G06T 17/00* (2006.01)

(52) U.S. Cl.
CPC ............ *G06T 19/20* (2013.01); *G06T 7/73* (2017.01); *G06T 17/00* (2013.01); *G06T 2207/10024* (2013.01); *G06T 2207/10028* (2013.01); *G06T 2210/56* (2013.01); *G06T 2219/2004* (2013.01); *G06T 2219/2012* (2013.01); *G06T 2219/2016* (2013.01)

(58) Field of Classification Search
CPC ........... G06T 19/20; G06T 7/73; G06T 17/00; G06T 2207/10024; G06T 2207/10028; G06T 2210/56; G06T 2219/2004; G06T 2219/2012; G06T 2219/2016
See application file for complete search history.

(56) References Cited

U.S. PATENT DOCUMENTS

| 9,772,405 | B2 * | 9/2017 | Mundhenk | G01S 17/89 |
| 2020/0258247 | A1 * | 8/2020 | Lasserre | G06T 7/529 |
| 2022/0358023 | A1 * | 11/2022 | Moser | G06F 11/0793 |

* cited by examiner

*Primary Examiner* — Sing-Wai Wu
(74) *Attorney, Agent, or Firm* — Ansari Katiraei LLP; Arman Katiraei; Sadiq Ansari

(57) ABSTRACT

Disclosed are systems and methods for splat filling a three-dimensional ("3D") model using semi-measured data. The splat filling includes generating measured data points for a 3D representation of a scene with positions that are measured from scanning the scene, and with color values defined from measured color values of used pixels from a two-dimensional ("2D") of the scene. The splat filling includes generating a semi-measured data point based on an unused pixel of the 2D image. The position of the semi-measured data point is derived based on a separation between the unused pixel and one or more used pixels of the 2D image, and based on the positions of measured data points that are defined with the measured color values of the one or more pixels. The color values of the semi-measured data point are defined directly from the measured color values associated with the unused pixel.

20 Claims, 8 Drawing Sheets

SYSTEMS AND METHODS FOR SPLAT FILLING A THREE-DIMENSIONAL IMAGE USING SEMI-MEASURED DATA

BACKGROUND

Traditional splat filling involves upsampling an image by generating interpolated or unmeasured image data from existing image data of the image that was measured or captured. For instance, a new point is generated in a point cloud in between two existing points by averaging the position and color values of the two existing points. The two existing points were defined from positional measurements produced by a scanner scanning a scene, and from color values measured by an imaging sensor or camera capturing the scene. However, the new point is defined without any measured values from the scanner or the camera, and is simply derived from the values of other points.

The new point therefore lacks the positional accuracy as well as the color accuracy of the measured points. Consequently, even though the new point may increase the density of the point cloud and increase the resolution of the image rendered from the point cloud, the increase of density and resolution come at the expense of degraded positional accuracy and color accuracy for the overall image.

DETAILED DESCRIPTION OF PREFERRED EMBODIMENTS

Figure 1:
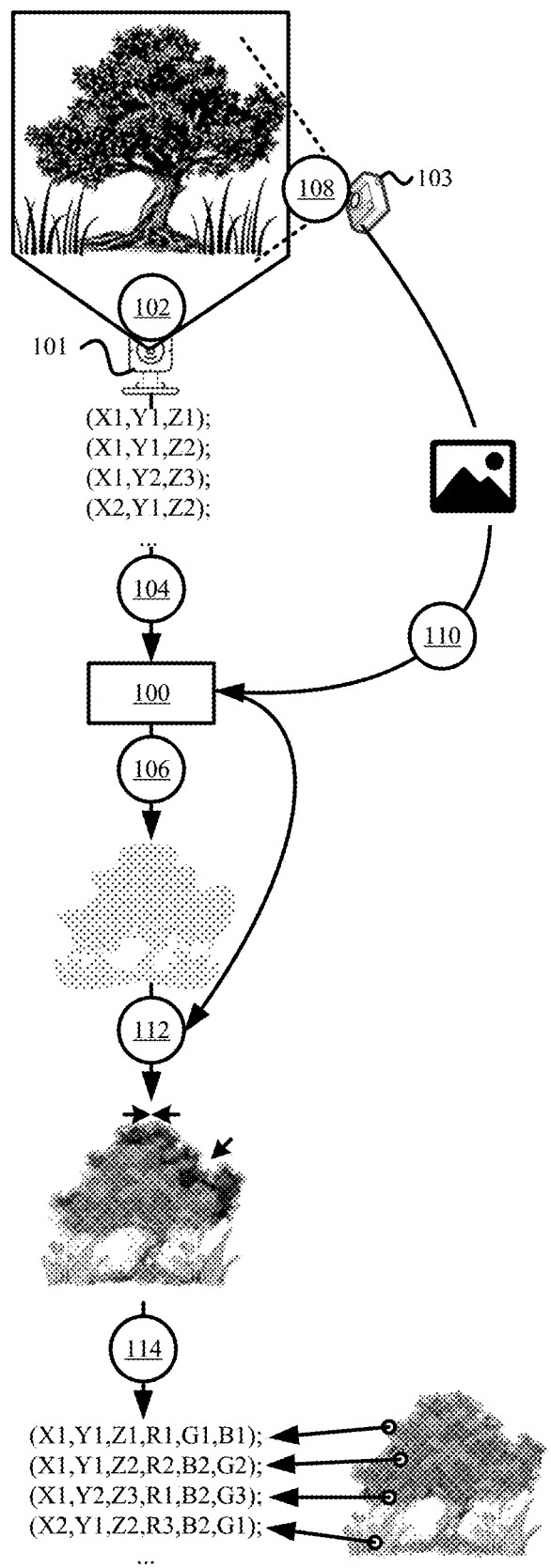
FIG. 1 illustrates generating fully measured points for a point cloud representation of a scene in accordance with some embodiments presented herein.

The following detailed description refers to the accompanying drawings. The same reference numbers in different drawings may identify the same or similar elements.

Provided are systems and methods for splat filling a three-dimensional ("3D") image using semi-measured data. Specifically, an image generation system uses measured color information from unused pixels of a two-dimensional ("2D") image to generate semi-measured points or image data that are added to fully measured points or image data of an image. Each fully measured points is defined with a position that is measured by a first device and with color values from used pixels of the 2D image that are measured by a second device. Each semi-measured is defined with a position that is derived (and not measured) from the positions of the fully measured points and with color values from the unused pixels of the 2D image that are measured by the second device.

A scanner corresponds to the first device and is used to scan a scene and to measure the exact positions of the surfaces, features, and objects of the scene. The image generation system generates and defines the positions of the fully measured points or image data for a 3D representation of the scene based on the measured positions. In other words, the fully measured points or image data accurately map the positions of the surfaces, features, and objects of the scene to corresponding positions in a 3D space of a point cloud or other 3D representation of the scene. Although, the fully measured points or image data accurately capture the structure of the scene, they do not capture the colors and/or other visual characteristics of the scene.

Accordingly, a camera or other imaging device corresponds to the second device that measures the colors and/or other visual characteristics of the scene via one or more sensors, and that outputs the measured colors and/or other visual characteristics to a 2D image. The image generation system performs a photogrammetry process that aligns a first set of pixels from the 2D image to the positions of the fully measured points, and that maps the color values and/or other visual characteristics from the first set of pixels to the measured points. Consequently, the fully measured points or image data of the 3D representation are defined from measured positional data and measured color data, and therefore precisely represent the positions and colors of the surfaces, features, and objects of the scene.

A second set of pixels from the 2D image are not mapped to or used to define color values for any of the fully measured points or image data because the second set of pixels do not align with the positions of any of the fully measured points in the point cloud or fully measured image data in the 3D representation of the scene. The image generation system uses the measured color values associated with the unused second set of pixels from the 2D image to generate the semi-measured points that are added to the fully measured points of the point cloud or 3D representation. The positioning of the semi-measured points are estimated or generated without reference to measured data from the scanner, but the coloring and/or other visual characteristics of the semi-measured points are defined based on the measured color data associated with the unused second set of pixels. Accordingly, image generation system performs the splat filling with semi-measured data by generating the semi-measured points at available positions in the point cloud that align with the positioning of the unused second set of pixels, and by attributing the color values and/or other measured visual characteristics from the unused second set of pixels to the semi-measured points that are created at the positions in the point cloud that align with the positioning of the unused second set of pixels in the 2D image.

FIG. 1 illustrates generating the fully measured points for a point cloud representation of a scene in accordance with some embodiments presented herein. Image generation system 100 generates the fully measured points based on outputs from scanner 101 and imaging device 103. Image generation system 100 includes one or more computing devices with one or more hardware processors, memory, storage, network, and/or other hardware resources for generating the fully measured points from the outputs of scanner 101 and imaging device 103, and for supplementing the fully measured points with the semi-measured points in accordance with some embodiments.

Image generation system 100 uses scanner 101 to accurately measure (at 102) the position of each point from each surface, feature, and/or object of the scene from one or more of a first set of positions. Scanner 101 may be a 3D or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, structured or patterned light imaging device, and/or other imaging equipment for 3D objects, volumetric objects, or 3D environments. Scanner 101 may be placed at the center of the scene, and may accurately measure (at 102) the position of each point from each surface, feature, and/or object of the scene based on the intensity and/or time with which lasers, light, sound, and/or other signals reflect off each point, the distortion of a structured or patterned light at each point, and/or other depth measuring techniques. In some embodiments, scanner 101 may measure (at 102) the position of each point within a micrometer of position, and the number of points measured by scanner 101 may be based on the density or number of lasers emitted from scanner 101 over a given area or region.

Image generation system 100 receives (at 104) the measured positional data from scanner 101. In some embodiments, image generation system 100 receives (at 104) the intensity values that are measured by scanner 101 for light or lasers that are emitted in different directions, and converts the intensity values into positional coordinates. In some other embodiments, image generation system 100 receives (at 104) the positional coordinates directly from scanner 101.

Image generation system 100 maps (at 106) the received (at 104) positional data (e.g., the position of each measured point scanned from each surface, feature, and/or object of the scene) to a corresponding position within a generated 3D space of a point cloud or other 3D image format. For instance, image generation system 100 may generate a point cloud with a set of data points that are distributed in 3D space. Each data point of the set of data points may be defined with x, y, and z coordinate positions to represent the position of a corresponding point from a surface, feature, and/or object of the scene measured by scanner 101.

Each point cloud data point may be defined with a plurality of elements. The plurality of elements may include a first set of positional elements, and a second set of non-positional or descriptive elements. The positional elements may include coordinates within the 3D space of the point cloud that are defined according to the measurements of scanner 101. The non-positional elements may initially be empty or contain null values as the scanner 101 may be capable of capturing positional information only. Accordingly, scanner 101 supplies measured positional data for the fully measured data points of the point cloud. The other measured non-positional data for the fully measured data points of the point cloud is obtained from the color information and/or other descriptive information of the pixels from the one or more images captured by imaging device 103.

Accordingly, image generation system 100 uses imaging device 103 to accurately measure (at 108) the descriptive characteristics (e.g., color, lighting, shading, reflectivity, etc.) of the same surfaces, features, and/or objects in the same scene from one or more of a second set of positions that may be the same or differ from the first set of positions of scanner 101. Imaging device 103 is a camera or other device with several photosites on a sensor. The photosites accurately measure (at 108) and capture the color, lighting, shading, reflectivity, and/or other descriptive characteristics of the scene. The measured descriptive characteristics are recorded to one or more 2D images that are output (at 110) from imaging device 103 to image generation system 100.

In some embodiments, the descriptive characteristics captured by imaging device 103 may include color data. The color data may be represented using red, green, blue ("RGB"), and/or other color values. In some embodiments, the descriptive characteristics may provide the chrominance, hardness, translucence, reflectivity, luminance, metallic characteristics, roughness, specular, diffuse, albedo, index of refraction ("IOR"), and/or other properties of the imaged surface, feature, or object. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic". In some embodiments, one or more of the descriptive characteristics (e.g., material property) may be derived or determined from the color, lighting, shading, reflectivity, and/or visual attributes captured in the images.

Image generation system 100 receives (at 110) the 2D images that accurately capture the measured colors and/or other visual characteristics for the surfaces, features, and/or objects of the scene represented by the point cloud data points generated from the measured positional data provided by scanner 101. Image generation system 100 aligns (at 112) the 2D images with the data points of the point cloud. Specifically, image generation system 100 aligns (at 112) the forms, shapes, or structures represented by the point cloud data points with shapes of corresponding structures in the 2D images.

In some embodiments, aligning (at 112) the 2D images may include changing the scale, size, orientation, position, and/or other aspects of the 2D images to best match the positioning of the surfaces, features, and/or objects represented by the point cloud data points. In some other embodiments, aligning (at 112) the 2D images includes generating a photogrammetry derived 3D model of the scene based on the 2D images that are captured by imaging device 103. Image generation system 100 uses one or more photogrammetry techniques to generate the 3D model of the scene based on the different angles and distances at which the surfaces, features, and/or objects of the scene are captured in the 2D images. Image generation system 100 then aligns the photogrammetry-generated 3D model of the scene with the 3D model represented by the point cloud data points.

Image generation system 100 colorizes (at 114) the point cloud data points by mapping the measured color values and/or other descriptive characteristics from a set of pixels in the captured 2D images to point cloud data points that are positionally aligned (at 112) with that set of pixels. For instance, image generation system 100 selects a data point with empty or null non-positional elements, determines a pixel from the aligned 2D images that is positionally aligned and/or represents the same point of an imaged surface, feature, or object as the selected data point, and defines the non-positional elements of the selected data points with the measured color values and/or descriptive characteristics of the pixel. In this manner, image generation system 100 generates the point cloud with a fully measured set of data points. Specifically, the positional elements of the fully measured set of data points are defined based on positional data that is measured using scanner 101, and the non-positional elements of the fully measured set of data points are defined based on color values and/or other visual characteristics that are measured with the photosites of imaging device 103.

In some cases, imaging device 103 captures the scene with a higher resolution or with a greater number of pixels than the number of data points whose positions are measured with scanner 101. Accordingly, the color data from a first set of pixels of the 2D images may be mapped and used to define the non-positional elements for the fully measured set of data points, while a second set of pixels of the 2D images are not used during the colorization and whose color data are not mapped to the non-positional elements of any of the fully measured set of data points.

Rather than discard the accurately measured color data stored by the second set of pixels, image generation system 100 performs a splat filling technique that generates a semi-measured set of data points to supplement and enhance the fully measured set of data points. The semi-measured set of data points are defined with semi-measured data. Specifically, the non-positional elements of the semi-measured set of data points are defined directly from the measured color data stored by the unused second set of pixels from the 2D images captured by imaging device 103, and the positional elements of the semi-measured set of data points are derived, rather than measured. For instance, the positional elements of a semi-measured data point is derived from the measured positions of the fully measured data points that are defined with color values from used pixels of the first set of pixels that neighbor or border an unused pixel that is used to colorize or define the non-positional elements of that semi-measured data point. Accordingly, the semi-measured data points do not represent the structure, shape, or form of the surfaces, features, and/or objects of the scene with same positional accuracy as the fully measured data points, but the semi-measured data points accurately represent the colors and visual characteristics of the surfaces, features, and/or objects without any color degradation, estimation, or other loss of quality associated with fully interpolated or derived data points.

The splat filling technique with semi-measured data is performed to fill in gaps or sparsely captured regions of the point cloud. For instance, scanner 101 may measure the positions of the surfaces, features, or objects of the scene at a resolution that results in visible gaps or empty space between neighboring data points or sets of points in the point cloud. Alternatively, scanner 101 may measure the positions of the surfaces, features, or objects at a sufficiently high resolution in which there are no visible gaps or empty space when viewing the point cloud representation generated from the positional data from a first distance or position. However, a user may zoom into the point cloud representation such that the separation between the fully measured data points becomes larger, more pronounced, and visible in a zoomed-in rendering of the point cloud representation. Image generation system 100 fills these gaps with semi-measured data to increase the density of data points which, in turn, increases the resolution of the point cloud. Moreover, the splat filling with the semi-measured data improves the color accuracy of the point cloud in splat filled regions or gaps relative to other techniques that fill in the empty regions or gaps with colors that are wholly interpolated or averaged from neighboring fully measured data points.

Figure 2:
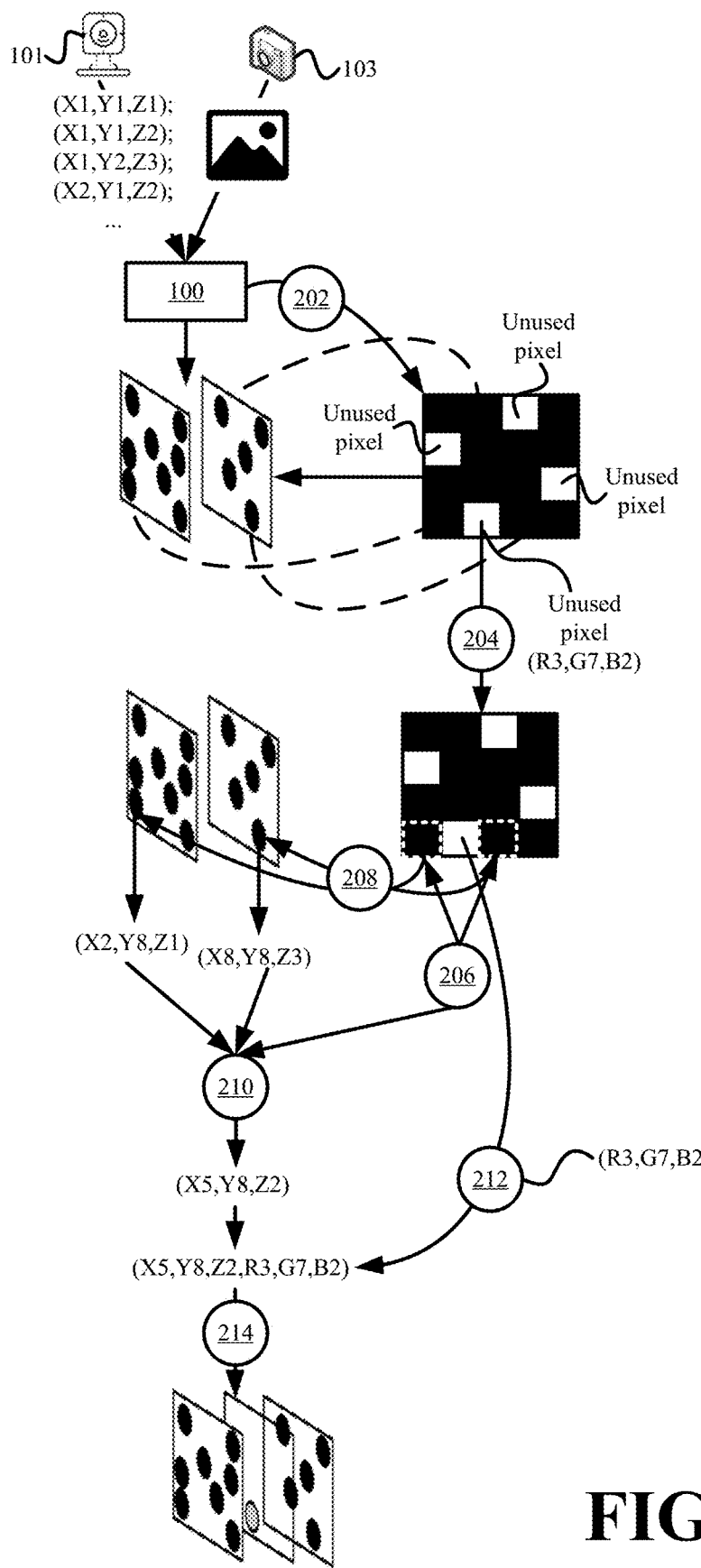
FIG. 2 illustrates an example of splat filling with semi-measured data in accordance with some embodiments presented herein.

FIG. 2 illustrates an example of splat filling with semi-measured data in accordance with some embodiments presented herein. Image generation system 100 tracks (at 202) a first set of pixels from one or more 2D images whose color values and/or visual characteristics were mapped to the non-positional elements of fully measured data points in a point cloud, and a second set of pixels from the one or more 2D images whose color values and/or visual characteristics were not mapped or used to define the non-positional elements of any of the fully measured data points. Image generation system 100 selects (at 204) a pixel from the second set of pixels.

Image generation system 100 determines (at 206) two or more used pixels that are nearest or closest to the selected unused pixel in the one or more 2D images and that were used to define non-positional elements of two or more fully measured data points. Image generation system 100 retrieves (at 208) the measured positional elements of the two or more fully measured data points, and derives (at 210) a position for a new semi-measured data point based on the measured positional elements of the two or more fully measured data points and the distance or separation between the selected unused pixel and each of the two or more used pixels. For instance, if the two or more used pixels are on either side of the selected unused pixel or directly neighbor the selected unused pixel in the one or more 2D images, image generation system 100 defines x, y, and z coordinates for the new semi-measured data point as an average or median of the x, y, and z coordinates defined for the positional elements of the two or more fully measured data points that received their color values or non-positional elements from the two or more used pixels.

Image generation system 100 colorizes (at 212) the new semi-measured data point using the color values and/or other descriptive characteristics associated with the selected unused pixel. For instance, image generation system 100 directly copies the color values and/or other visual characteristics stored by the selected unused pixel to the non-positional elements of the new semi-measured data point.

Image generation system 100 adds (at 214) the semi-measured data point into the point cloud. Consequently, the semi-measured data points may be rendered with the fully measured data points of the point cloud to produce an upsampled or enhanced image in which a gap that was previously observable in the position of the semi-measured data point is now filled in with the measured color values from the selected unused pixel (now a used pixel) of the 2D image that was mapped to the semi-measured data point with a derived position that covers or fills in that gap.

In some embodiments, image generation system 100 performs the splat filling with the semi-measured data until a semi-measured data point is created for all unused pixels of the 2D images that were captured for the scene represented by the point cloud. In some other embodiments, image generation system 100 selectively performs the splat filling with the semi-measured data for regions of the point cloud where the density of the fully measured data points is less than a threshold, or to normalize the density of data points across the point cloud (e.g., provide a uniform density of data points across the point cloud). In some such embodiments, image generation system 100 may analyze the distribution of the fully measured data points in a point cloud, identify regions in which the density of the fully measured data points is less than the threshold or is less than a specified uniform density, and generates one or more semi-measured data points for those identified regions until the density satisfies the threshold or matches the specified uniform density in other regions of the point cloud.

Figure 3:
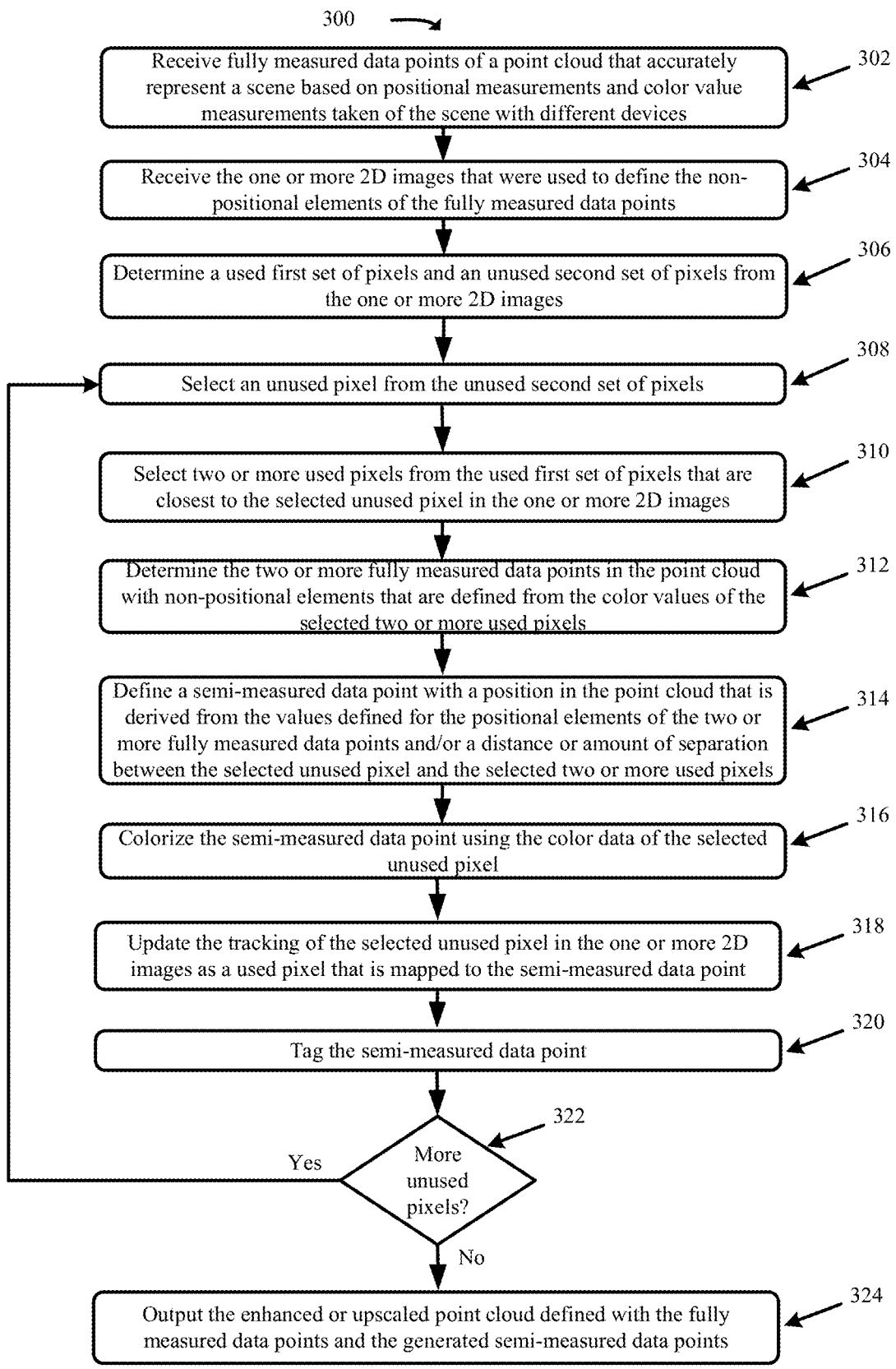
FIG. 3 presents a process for generating semi-measured data points to supplement the fully measured data points of a point cloud in accordance with some embodiments presented herein.

FIG. 3 presents a process 300 for generating the semi-measured data points to supplement the fully measured data points of a point cloud in accordance with some embodiments presented herein. Process 300 is implemented by image generation system 100. In some embodiments, image generation system 100 implements process 300 as part of generating the fully measured data points from measured position data provided by scanner 101 and measured color or visual characteristic data captured by imaging device 103. In some other embodiments, image generation system 100 implements process 300 after the fully measured data points are generated, and during an upscaling or enhancement of the generated point cloud.

Process 300 includes receiving (at 302) the fully measured data points that accurately represent a scene based on surface, feature, or object positions measured from the scene using a first device, and color values across the surfaces, features, or objects of the scene that were measured and/or captured with a second device. In some embodiments, receiving (at 302) the fully measured data points include generating the fully measured data points by defining the positional elements of the data points using the measured positional data, and by defining the non-positional elements using the measured color values.

Process 300 includes receiving (at 304) the one or more 2D images that were used to define the non-positional elements of the fully measured data points. The one or more 2D images contain pixels that are defined from the measured color values and/or descriptive characteristics. Some, but not all, of the pixels are used in defining the non-positional elements of the fully measured data points. In other words, the one or more 2D images collectively have a greater number of pixels than a number of positional measurements or scanned points of surfaces, features, and/or objects of the scene measured by scanner 101, or that collectively have a greater number of pixels than the number of fully measured data points in the point cloud. The one or more 2D images may be aligned with the fully measured data points of the point cloud using a photogrammetry or other alignment technique. For instance, image generation system 100 positions, maps, or otherwise associates pixels representing specific surfaces, features, or objects of a scene relative to the fully measured data points that represent those same specific surfaces, features, or objects.

Process 300 includes determining (at 306) a used first set of pixels and an unused second set of pixels from the one or more 2D images. The used first set of pixels include the pixels from the one or more 2D images that were used to define the non-positional elements of the fully measured data points in the point cloud, and the unused second set of pixels include the pixels from the one or more 2D images that were not used to define the non-positional elements for any of the fully measured data points. In some embodiments, image generation system 100 tracks or marks the used first set of pixels when generating the fully measured data points. For instance, image generation system 100 may track the x and y coordinate positions of each pixel from the used first set of pixels when the color values of that pixel are used to define the non-positional elements of a fully measured data point during the point cloud generation.

Process 300 includes selecting (at 308) an unused pixel from the unused second set of pixels. The unused pixel contains the measured color data that will be used to generate a new semi-measured data point.

Image generation system 100 may select (at 308) each unused pixel from the unused second set of pixels for the generation of a new semi-measured data point, or may dynamically select (at 308) the unused pixel from the unused second set of pixels based on one or more selection criteria. The selection criteria may be defined relative to the density or distribution of the fully measured data points in the point cloud. For instance, the selection criteria may specify selection of an unused pixel with x and y positions in the one or more 2D images that correspond or map to a region of the point cloud with a density of fully measured data points that is less than a desired threshold density or with a density that is less than a uniform density specified for the point cloud. In other words, the number of fully measured data points generated in a region or volume of the point cloud is the less then the threshold, or the distance separating the fully measured data points in the region or volume is greater than a threshold distance. In some embodiments, the selection criteria determines if the selected unused pixel correctly fills a gap in the point cloud by determining whether the color data of the selected unused pixel does not deviate by more than a threshold amount from the color data of surrounding used pixels. The selected unused pixel may be determined to be part of the same surface, feature, or object as the surrounding used pixels when the color data does not deviate by more than the threshold amount. However, the selected unused pixel may be determined to be part of a different surface, feature, or object or a background that does not correctly fill a gap in between the fully measured data points of the point cloud that are defined from the surrounding used pixels. Accordingly, image generation system 100 uses the selection criteria to avoid splat filling a gap between data points representing a particular surface, feature, or object with pixels for a background that is visible through that gap between the data points representing that particular surface.

Process 300 includes selecting (at 310) two or more used pixels from the used first set of pixels that are closest to the selected unused pixel in the one or more 2D images. In some embodiments, image generation system 100 selects (at 310) used pixels that are adjacent to, surround, or border the selected unused pixel. The two or more used pixels will be used as reference points from which to derive the position for the semi-measured point representing the selected unused pixel in the point cloud.

Process 300 includes determining (at 312) the two or more fully measured data points in the point cloud with non-positional elements that are defined from the color values of the selected two or more used pixels. In some embodiments, image generation system 100 stores a mapping between the used first set of pixels and the fully measured data points of the point cloud that are defined using the measured color data of those used first set of pixels. For instance, image generation system 100 maps the x and y position of a used pixel to the x, y, and z position of a fully measured data point with non-positional elements that are defined from the color values of the used pixel.

Process includes defining (at 314) a semi-measured data point with a position in the point cloud that is derived from the values defined for the positional elements (e.g., x, y, and z coordinates) of the two or more fully measured data points and/or a distance or amount of separation between the selected unused pixel and the selected two or more used pixels in the 2D image. In some embodiments, image generation system 100 determines a conversion or mapping between x and y coordinates for the pixels in the one or more 2D images and the x and y coordinates for the fully measured data points defined from those same pixels in the point cloud, and uses that conversion or mapping to define the x and y position for the semi-measured data point from the x and y positions of the two or more fully measured data points and the difference or delta between the x and y positions of the selected unused pixel and the x and y positions of the selected two or more used pixels in the one or more 2D images. For instance, image generation system 100 determines that pixels that are next to each other in the same row of pixels result in fully measured data points with x-coordinate values that are offset by a value of 3, and that pixels that are atop one another in the same column of pixels result in fully measured data points with y-coordinate values that are offset by a value of 5. The z-coordinate value for the semi-measured data point may be the average of the z-coordinate value defined for surrounding fully measured data points, the media z-coordinate value, or the z-coordinate value of the closest fully measured data point. In some other embodiments, image generation system 100 defines (at 314) the positional elements of the semi-measured data point by averaging the positional element values or x, y, and z coordinates defined for the two or more fully measured data points.

Process 300 includes colorizing (at 316) the semi-measured data point using the color data of the selected unused pixel. Colorizing (at 316) the semi-measured data points includes defining the non-positional elements of the semi-measured data point using the color data (e.g., RGB values), visual characteristics, and/or descriptive characteristics that are measured and stored as part of the selected unused pixel. In other words, the measured color values associated with the selected unused pixel are copied into corresponding non-positional elements of the semi-measured data point.

Image generation system 100 updates the usage tracking of the pixels in the one or more 2D images to indicate that the selected unused pixel is now a pixel that was used to define the semi-measured data point. Accordingly, process 300 includes updating (at 318) the tracking of the selected unused pixel in the one or more 2D images as a used pixel that is mapped to the semi-measured data point.

Process 300 includes tagging (at 320) the semi-measured data point. The tagging (at 320) differentiates the semi-measured data point from the fully measured data points. For instance, image generation system 100 adds a non-positional element or metadata to the semi-measured data point that stores a semi-measured identifier or label. Image generation system 100 may use the tags to dynamically render the semi-measured data points with the fully measured data points when needed. For instance, image generation system 100 may render only the fully measured data points when the render position or focus depth does not produce any gaps in the rendered visualization, and may render the semi-measured data points with the fully measured data points when the render position or focus depth changes that makes gaps between the fully measured data points noticeable. Image generation system 100 may render the semi-measured data points to fill the gaps at that zoom level or based on the density of fully measured data points in a rendered region of the point cloud being less than a threshold density.

Process 300 includes determining (at 322) whether the one or more 2D images contain additional unused pixels as candidates for generating additional semi-measured data points. In response to determining (at 322—Yes) that the one or more 2D images contain additional unused pixels, process 300 includes selecting (at 308) a next unused pixel and generating a semi-measured data points based on the color data and/or other visual characteristics associated with that unused pixel. In response to determining (at 322—No) that the one or more 2D images do not contain additional unused pixels or unused pixels that have not been considered for generation of semi-measured data points, process 300 includes outputting (at 324) the enhanced or upscaled point cloud defined with the fully measured data points and the generated semi-measured data points for editing, viewing, rendering, and/or other processing.

Figure 4:
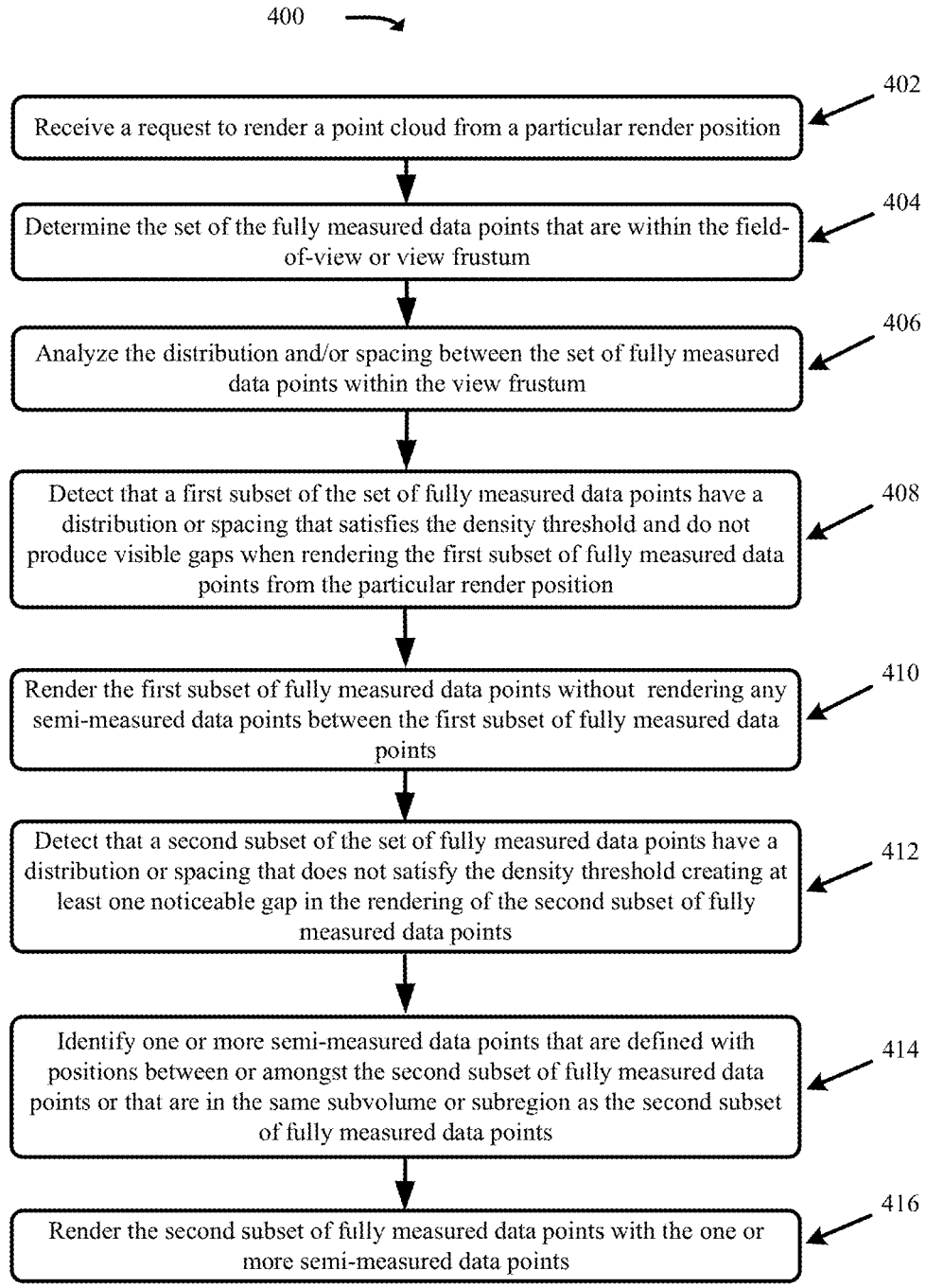
FIG. 4 presents a process for dynamically rendering the semi-measured data points with the fully measured data points in accordance with some embodiments presented herein.

FIG. 4 presents a process 400 for dynamically rendering the semi-measured data points with the fully measured data points in accordance with some embodiments presented herein. Process 400 is implemented by image generation system 100.

Process 400 includes receiving (at 402) a request to render a point cloud from a particular render position. For instance, a user provides input that adjusts the position, orientation, zoom depth, and/or other settings of a virtual camera within the point cloud in order to set the field-of-view or view frustum. The point cloud is defined with fully measured data points and semi-measured data points.

Process 400 includes determining (at 404) the set of the fully measured data points from the point cloud that are within the field-of-view or view frustum. For instance, image generation system 100 determines the coordinates for the near plane and the far plane of the view frustum, and identifies the set of fully measured data points with positional elements between the near plane and the far plane. The set of fully measured data points are differentiated from the semi-measured data points based on the tags that are applied to at least the semi-measured data points.

Process 400 includes analyzing (at 406) the distribution and/or spacing between the set of fully measured data points within the view frustum. Image generation system 100 may compare the positional elements between neighboring data points in the set of fully measured data points in order to determine the distance separating the neighboring data points or the densities of the fully measured data points in different regions of the view frustum. Image generation system 100 may then compare the distance or densities relative to the particular render position and/or zoom depth to determine if there gaps between the set of fully measured data points become visible. For instance, no gap is visible between neighboring fully measured data points that are a first distance apart when those neighboring fully measured data points are rendered at a far first distance from the render position. However, the first distance separating the neighboring fully measured data points becomes a visible gap when those neighboring fully measured data points are rendered at a closer second distance from the render position.

In some embodiments, analyzing (at 406) the distribution includes partitioning the view frustum into different subvolumes or cubic subregions, determining the distances between each subset of the fully measured data points in each subvolume or subregion, and comparing the distances against a density threshold. In some such embodiments, the size of the subvolume or subregions is determined according to the size of the render frustum and/or the zoom depth at which the set of fully measured data points are to be rendered, and the density threshold is set according to a distance or density distribution at which gaps between the fully measured data points become visible or noticeable in the view frustum or in the rendered visualization of the view frustum.

Process 400 includes detecting (at 408) that a first subset of the set of fully measured data points have a distribution or spacing that satisfies the density threshold and do not produce visible gaps when rendering the first subset of fully measured data points from the particular render position. Accordingly, process 400 includes rendering (at 410) the first subset of fully measured data points without rendering any semi-measured data points that are positioned between or amongst the first subset of fully measured data points. Rendering (at 410) the first subset of fully measured data points includes generating a visualization for a first part of the view frustum based on the positional and non-positional elements of the first subset of fully measured data points.

Process 400 includes detecting (at 412) that a second subset of the set of fully measured data points have a distribution or spacing that does not satisfy the density threshold creating at least one noticeable gap in the rendering of the second subset of fully measured data points. Process 400 includes identifying (at 414) one or more semi-measured data points that are defined with positions between or amongst the second subset of fully measured data points or that are in the same subvolume or subregion as the second subset of fully measured data points. Process 400 includes rendering (at 416) the second subset of fully measured data points with the one or more semi-measured data points in order to generate a visualization for a second part of the view frustum based on the positional and non-positional elements of the second subset of fully measured data point and the one or more semi-measured data points.

In some embodiments, the dynamic rendering may be further enhanced to include fully interpolated or fully derived data points in conjunction with the semi-measured data points when rendering a sparse region of the point cloud or zooming in to a level that exposes gaps between the rendered fully measured and semi-measured data points. Image generation system 100 generates the fully interpolated or fully derived data points in between pairs of fully measured and/or semi-measured data points by averaging the positional and non-positional elements of the pair of data points. Accordingly, the fully interpolated data points are not defined with any values directly measured for those data points. The fully interpolated data points therefore have lesser color accuracy than the semi-measured data points, and provide splat filling, albeit at a degraded quality relative to the splat filling provided by the semi-measured data points.

Figure 5:
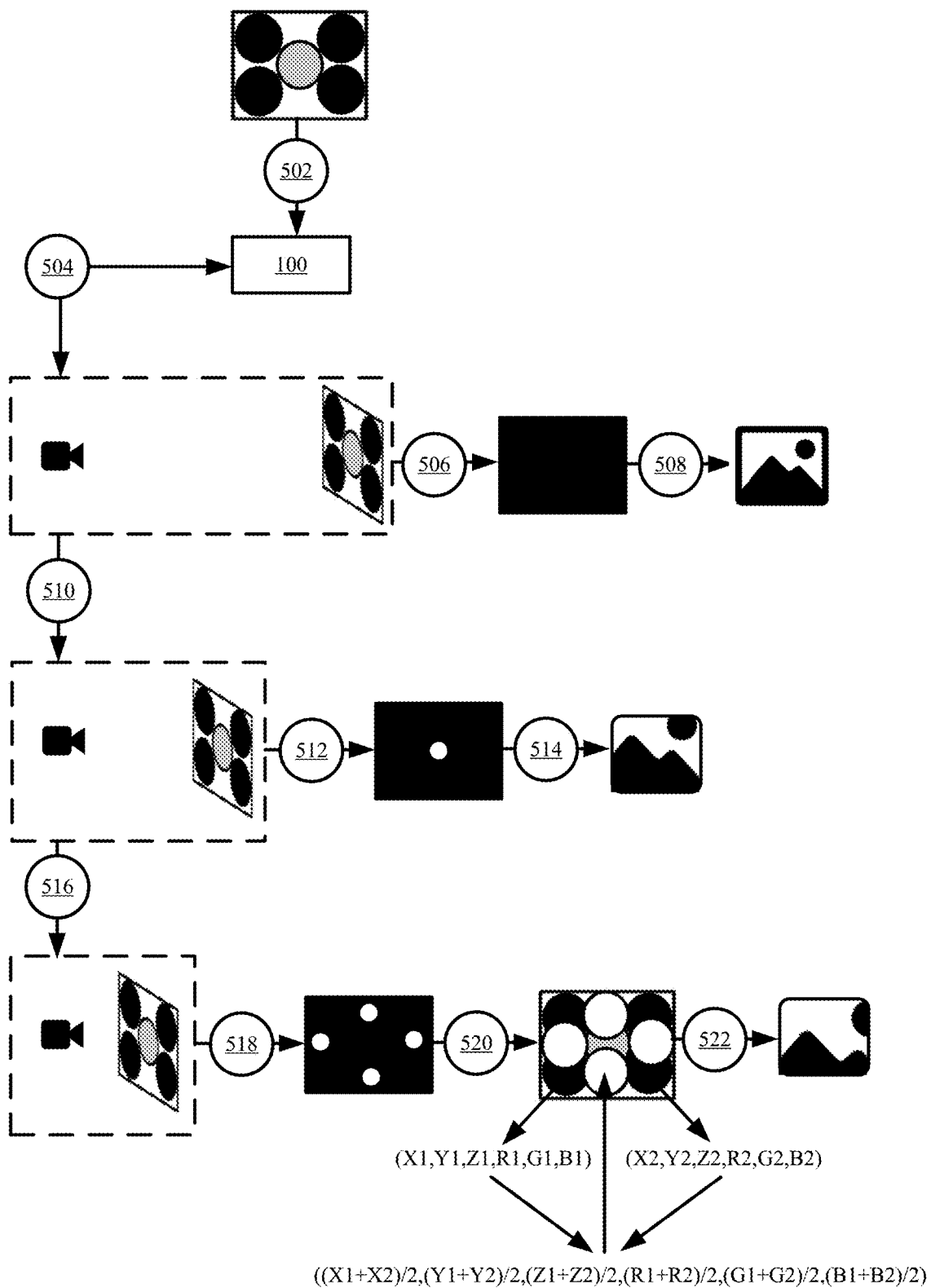
FIG. 5 illustrates an example of dynamic splat filling with semi-measured data points and fully interpolated data points in accordance with some embodiments presented herein.

FIG. 5 illustrates an example of dynamic splat filling with semi-measured data points and fully interpolated data points in accordance with some embodiments presented herein. Image generation system 100 receives (at 502) a point cloud or 3D representation of a scene that includes a set of fully measured data points (represented by fully black circles) and one or more semi-measured data points (represented by the grey circles) that are generated in between the set of fully measured data points.

Image generation system 100 receives (at 504) a request to render the 3D representation from a first render position or first distance. Image generation system 100 determines (at 506) that the set of fully measured data points are far enough from the first render position that the spacing between the set of fully measured data points is not visible. Accordingly, image generation system 100 renders (at 508) the set of fully measured data points without rendering any semi-measured or fully interpolated data points.

The user changes (at 510) the render position from the first render position or first distance to a closer second render position or second distance that zooms into the data points. Image generation system 100 determines (at 512) that the spacing between the set of fully measured data points becomes visible at the first render position or first distance, and that the semi-measured data points are positioned to fill those gaps. Accordingly, image generation system 100 renders (at 514) the set of fully measured data points and the one or more semi-measured data points interspersed between the set of fully measured data points to present an upsampled visualization of the point cloud from the zoomed in view that hides the gaps between the set of fully measured data points with the rendered semi-measured data points.

The user zooms in (at 516) further from the second render position to a closer third render position. From the third render position, additional gaps between the set of fully measured data points become visible. Image generation system 100 determines (at 518) that the gaps visible from the third render position are visible even when rendering the set of fully measured data points with the semi-measured data points and that there are no semi-measured data points to fill the gaps in the third render position. In other words, the resolution required for the third render position exceeds the resolution of the 2D images that captured the scene, and there are no additional unused pixels from the 2D images with which to fill the gaps with measured color data. Accordingly, image generation system 100 generates (at 520) a set of fully interpolated data points (represented by the white circles) to fill the gaps. Image generation system 100 generates (at 520) the set of fully interpolated data points from the positional and non-positional values of the set of fully measured data points and/or semi-measured data points. For instance, image generation system 100 generates (at 520) a fully interpolated data point between a pair of adjacent fully measured data points by defining the positional and non-positional elements of the fully interpolated data points from an average of the positional and non-positional elements of the pair of adjacent fully measured data points. Image generation system 100 generates the upsampled gapless visualization for the zoomed-in third render position by rendering (at 522) the set of fully measured data points, the one or more semi-measured data points, and the set of fully interpolated data points.

In some embodiments, image generation system 100 adapts the splat filling with the semi-measured data points for image editing purposes. For instance, a user may edit a point cloud or other 3D image to move or cut out an object from the point cloud or other 3D image. Rather than render a blank or empty background at the previous position of the object, image generation system 100 may perform the splat filling with the semi-measured data to fill the region or volume previously occupied by the object with semi-measured image data.

Figure 6:
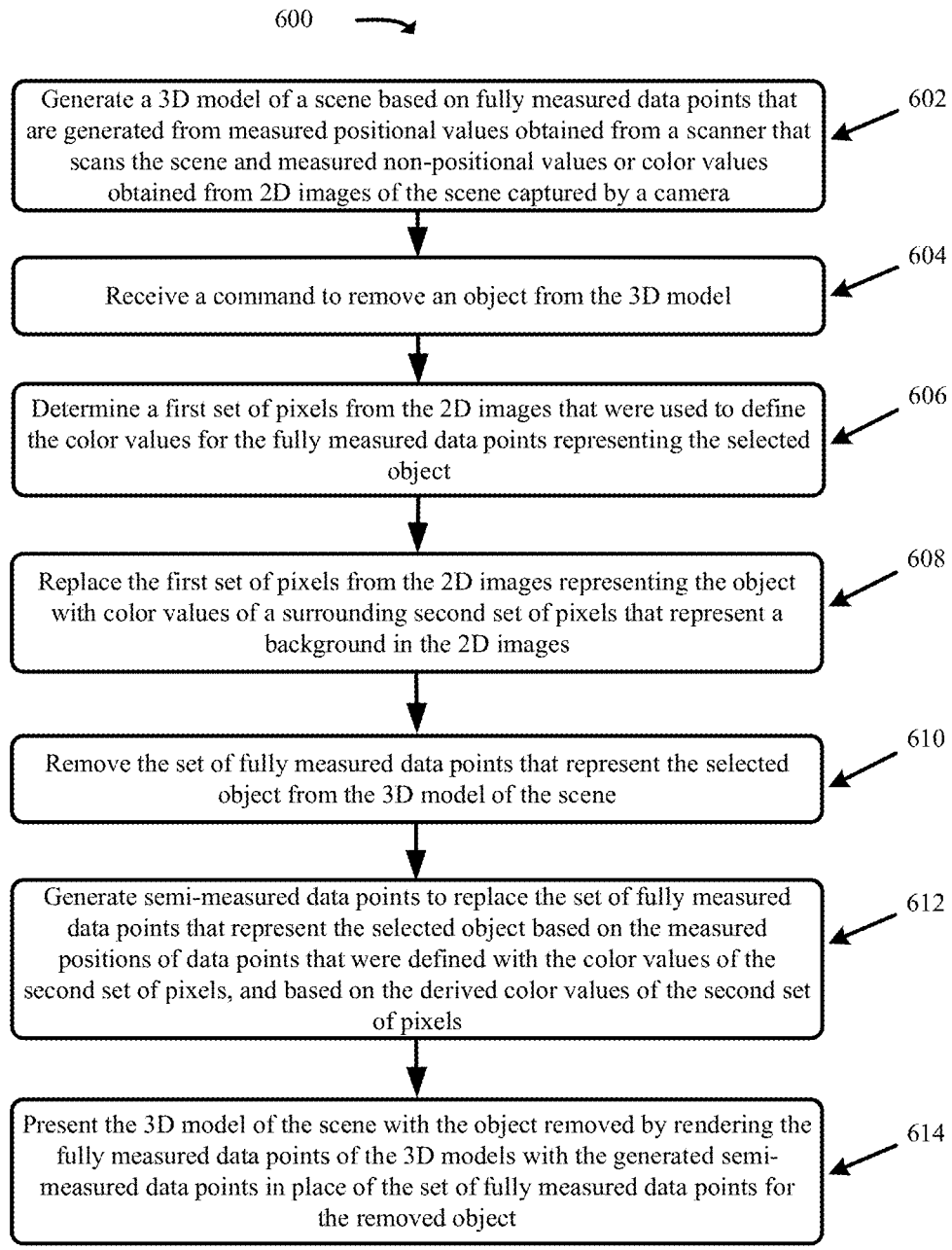
FIG. 6 presents a process for editing 3D images with the splat filling of semi-measured data points in accordance with some embodiments presented herein.

FIG. 6 presents a process 600 for editing 3D images with the splat filling of semi-measured data points in accordance with some embodiments presented herein. Process 600 is implemented by image generation system 100.

Process 600 includes generating (at 602) a 3D model of a scene. Image generation system 100 generated (at 602) the 3D model based on fully measured data points that are generated from measured positional values obtained from a scanner that scans the scene and measured non-positional values or color values obtained from 2D images of the scene captured by a camera.

Process 600 includes receiving (at 604) a command to remove an object from the 3D model. For instance, the user uses a 3D magic eraser tool to specify the removal of the object. In some embodiments, the user selects the object by drawing a border around the object to be removed, or the selects one or more data points of the object.

Process 600 includes determining (at 606) a first set of pixels from the 2D images that were used to define the color values for the fully measured data points representing the selected object. For instance, image generation system 100 detects commonality or a pattern in the color values of the fully measured data points that were selected or otherwise identified with the command, and selects the first set of pixels in the 2D images having the same common color values. Accordingly, the command may involve selecting more or less fully measured data points than the full set of data points that make up the object, and image generation system 100 is nevertheless able to automatically adjust the selection to include only the set of fully measured data points forming the object based on the detected commonality in the color values, and to map back the set of fully measured data points to the first set of pixels in the 2D images.

Process 600 include replacing (at 608) the first set of pixels from the 2D images representing the object with color values of a surrounding second set of pixels that represent a background in the 2D images. For instance, image generation system 100 applies existing 2D magic eraser or object removal techniques to remove the first set of pixels from the 2D images and to algorithmically fill the removed pixels with a surrounding background (e.g., the second set of pixels) in a seamless and blended manner.

Process 600 includes removing (at 610) the set of fully measured data points that represent the selected object from the 3D model of the scene. The set of fully measured data points are the data points that are defined with the color values of the replaced first set of pixels.

Process 600 includes generating (at 612) semi-measured data points to replace the set of fully measured data points that represent the selected object based on the measured positions of data points that were defined with the color values of the second set of pixels, and based on the derived color values of the second set of pixels. In other words, image generation system 100 maps the measured positions of the data points created for the background to the semi-measured data points, and attributes the color values that are derived for the generated background second set of pixels via an existing 2D magic eraser techniques to the semi-measured data points. In this manner, image generation system 100 creates a 3D magic eraser tool for removing objects from 3D models and to fill the gap created by the removal of the objects with semi-measured data points.

Process 600 includes presenting (at 614) the 3D model of the scene with the object removed by rendering the fully measured data points of the 3D models with the generated (at 612) semi-measured data points in place of the set of fully measured data points for the removed object.

In some embodiments, image generation system 100 adapts the splat filling to increase the resolution of a point cloud by adding fully measured data points based on extraneous pixels of 2D images. A 2D image that is of a higher resolution than a 3D image and/or that contains more pixels than data points in the 3D image may have two or pixels map to the position of the same data point. Image generation 100 may partition the data point into multiple smaller data points that encompass the same positions in the 3D image as the original data point, and may colorize the multiple smaller data points using color values from different adjacent pixels of the 2D image that are positionally aligned with the multiple smaller data points. Accordingly, image generation system 100 increases the resolution of the 3D image to match the resolution of the 2D image by introducing fully measured data points that encompass the same space or volume as an originally measured data point and by attributing measured color values from different pixels of the 2D image to those newly introduced fully measured data points.

Figure 7:
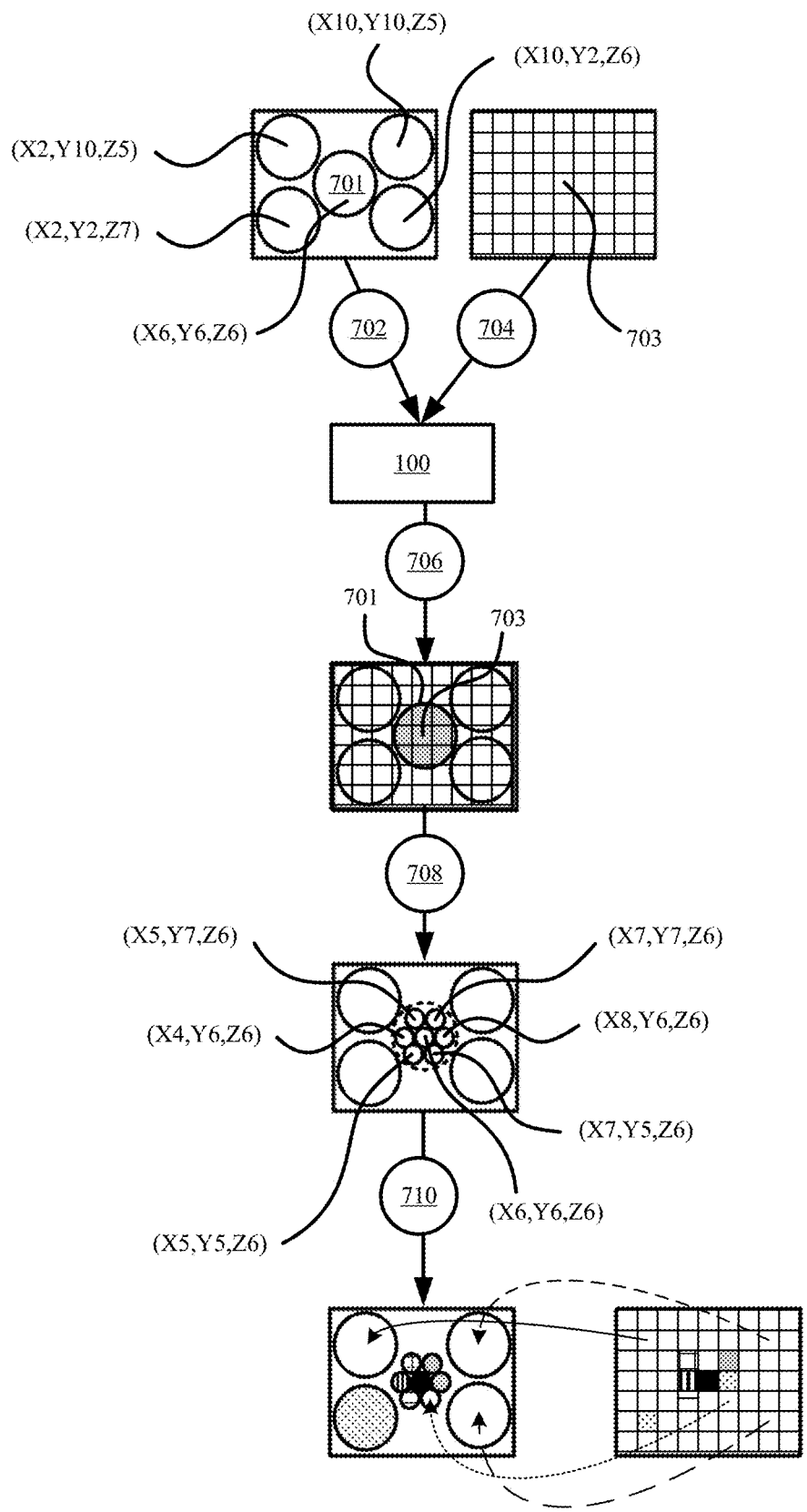
FIG. 7 illustrates an example of splat filling a 3D image with fully measured data points in accordance with some embodiments presented herein.

FIG. 7 illustrates an example of splat filling a 3D image with fully measured data points in accordance with some embodiments presented herein. Image generation system 100 obtains or generates (at 702) a first set of fully measured data points of a point cloud that accurately represent a scene based on positional measurements and color value measurements taken of a scene with different devices. Image generation system 100 obtains or retrieves (at 704) a 2D image that provided the measured color values attributed to the first set of fully measured data points.

Image generation system 100 determines (at 706) that 9 pixels from the 2D image are aligned with the position of data point 701 based on the 2D image having a higher resolution than the point cloud, and/or the 2D image having more pixels than the point cloud has data points. The color values of data point 701 are defined from the measured color values of pixel 703 that is most aligned with or that is at the center of the particular data point.

In some embodiments, data point 701 has a particular position (e.g., a particular x, y, and z position) that aligns with pixel 703. However, data point 701 has a size or volume that is larger than the size of pixel 703, and therefore spans the region in the 2D image defined by the multiple pixels.

Image generation system 100 divides (at 708) data point 701 into a set of smaller data points. The set of smaller data points inherit or derive their positional values from the positional values of data point 701. For instance, the set of smaller data points may be defined with positional values that have smaller increments or offset distances than the positional values of data point 701. In any case, the positional values defined for each data point of the set of smaller data point is within region of volume spanned by point data 701.

Image generation system 100 determines a different pixel from the set of pixels that is aligns most directly with the position of one of the set of smaller data points. Image generation system 100 defines (at 710) the color values of each smaller data point with the color values of the aligned pixel.

Accordingly, image generation system 100 increases the resolution, detail, and/or color accuracy of the point cloud by splat filling the point cloud with a second set of fully measured data points. Specifically, the positions of the second set of fully measured data points are measured as a result of being inherited from another larger data point of the point cloud, and the color values of the second set of fully measured data points are measured as they are mapped from unused pixels of the 2D image.

Figure 8:
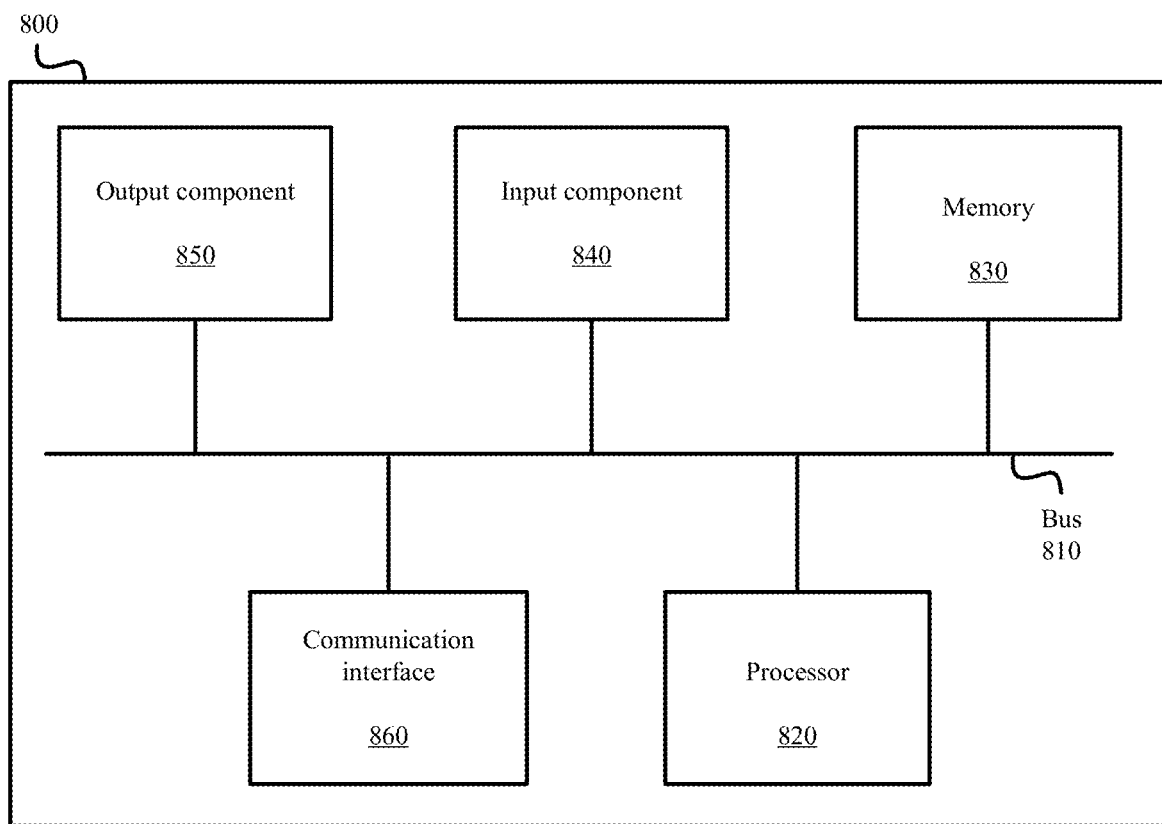
FIG. 8 illustrates example components of one or more devices, according to one or more embodiments described herein.

FIG. 8 is a diagram of example components of device 800. Device 800 may be used to implement one or more of the devices or systems described above (e.g., image generation system 100). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of measured positions from scanning a scene;
   receiving a two-dimensional ("2D") image of the scene, the 2D image comprising a plurality of pixels with measured color values of the scene;
   generating a three-dimensional ("3D") representation of the scene comprising a plurality of measured data points with positions defined from the plurality of measured positions and with color values defined from the measured color values of a first set of the plurality of pixels that are aligned in the 2D image with the positions defined for the plurality of measured data points in the 3D representation;

selecting an unused pixel from the plurality of pixels with which to splat fill the 3D representation, wherein the unused pixel is not within the first set of pixels, and wherein the measured color values of the unused pixel are not used in defining the color values of a measured data point from the plurality of measured data points;

generating a semi-measured data point for the unused pixel in the 3D representation by deriving a position for the semi-measured data point based on a separation between the unused pixel and one or more pixels of the first set of pixels in the 2D image, and based on the positions of one or more measured data points from the plurality of measured data points that are defined with the measured color values of the one or more pixels; and defining color values of the semi-measured data point based on the measured color values associated with the unused pixel.

2. The method of claim 1 further comprising:
modifying the 3D representation by adding the semi-measured data point amongst the plurality of measured data points at the position derived for the semi-measured data point.

3. The method of claim 1 further comprising:
upscaling the 3D representation by rendering the semi-measured data point with the plurality of measured data points.

4. The method of claim 1 further comprising:
generating a first visualization of the 3D representation by rendering the plurality of measured data points without the semi-measured data point; and
generating a second visualization of the 3D representation that fills a gap at the position of the semi-measured data point by rendering the plurality of measured data points with the semi-measured data point.

5. The method of claim 1 further comprising:
rendering the plurality of measured data points without the semi-measured data point in response to a first render position; and
rendering the plurality of measured data points with the semi-measured data point in response to a second render position that zooms in from the first render position.

6. The method of claim 1 further comprising:
tagging the semi-measured data point with an identifier that differentiates the semi-measured data point from the plurality of measured data points.

7. The method of claim 6 further comprising;
generating a first visualization of the 3D representation that excludes the semi-measured data point based on the tagging; and
generating a second visualization of the 3D representation that includes the semi-measured data point based on the tagging.

8. The method of claim 1 further comprising:
determining that a distance between the plurality of measured data points is less than a threshold when rendering the 3D representation from a first render position;
generating a first visualization from the first render position by rendering the plurality of measured data points without the semi-measured data point in response to determining that the distance is less than the threshold;
determining that a distance between the plurality of measured data points is greater than the threshold when rendering the 3D representation from a second render position; and generating a second visualization from the second render position by rendering the plurality of measured data points and the semi-measured data point in response to determining that the distance is greater than the threshold.

9. The method of claim 1, wherein generating the 3D representation comprises:
copying the measured color values from the first set of pixels to the color values of the plurality of measured data points; and
tracking the first set of pixels as used pixels of the 2D image.

10. The method of claim 1, wherein generating the 3D representation comprises:
aligning objects represented in the 2D image with structures of corresponding objects represented by the positions of the plurality of measured data points; and
mapping the measured color values of a particular pixel from the first set of pixels to the color values of a particular measured data point from the plurality of measured data points that is aligned with the particular pixel.

11. The method of claim 1 further comprising:
generating a photogrammetry-generated 3D model of the scene based on the 2D image; and
aligning the photogrammetry-generated 3D model with the positions defined for the plurality of measured data points based on the plurality of measured positions.

12. The method of claim 1 further comprising:
filling a gap in the 3D representation with the semi-measured data point.

13. The method of claim 1 further comprising:
generating a semi-measured data point for each unused pixel of a second set of the plurality of pixels that is not used in defining the color values of a measured data point from the plurality of measured data points.

14. The method of claim 1 further comprising:
upscaling the 3D representation by generating a set of semi-measured data points with positions derived from the positions of the plurality of measured data points and with color values defined from the measured color values of a second set of the plurality of pixels that are not used in defining the color values of a measured data point from the plurality of measured data points.

15. A system comprising:
one or more hardware processors configured to:
receive a plurality of measured positions from scanning a scene;
receive a two-dimensional ("2D") image of the scene, the 2D image comprising a plurality of pixels with measured color values of the scene;
generate a three-dimensional ("3D") representation of the scene comprising a plurality of measured data points with positions defined from the plurality of measured positions and with color values defined from the measured color values of a first set of the plurality of pixels that are aligned in the 2D image with the positions defined for the plurality of measured data points in the 3D representation;
select an unused pixel from the plurality of pixels with which to splat fill the 3D representation, wherein the unused pixel is not within the first set of pixels, and wherein the measured color values of the unused pixel are not used in defining the color values of a measured data point from the plurality of measured data points;

generate a semi-measured data point for the unused pixel in the 3D representation by deriving a position for the semi-measured data point based on a separation between the unused pixel and one or more pixels of the first set of pixels in the 2D image, and based on the positions of one or more measured data points from the plurality of measured data points that are defined with the measured color values of the one or more pixels; and define color values of the semi-measured data point based on the measured color values associated with the unused pixel.

16. The system of claim 15, wherein the one or more hardware processors are further configured to:

modify the 3D representation by adding the semi-measured data point amongst the plurality of measured data points at the position defined for the semi-measured data point.

17. The system of claim 15, wherein the one or more hardware processors are further configured to:

upscale the 3D representation by rendering the semi-measured data point with the plurality of measured data points.

18. The system of claim 15, wherein the one or more hardware processors are further configured to:

generate a first visualization of the 3D representation by rendering the plurality of measured data points without the semi-measured data point; and generate a second visualization of the 3D representation that fills a gap at the position of the semi-measured data point by rendering the plurality of measured data points with the semi-measured data point.

19. The system of claim 15, wherein the one or more hardware processors are further configured to:

render the plurality of measured data points without the semi-measured data point in response to a first render position; and render the plurality of measured data points with the semi-measured data point in response to a second render position that zooms in from the first render position.

20. A non-transitory computer-readable medium storing program instructions that, when executed by one or more hardware processors of an image generation system, cause the image generation system to perform operations comprising:

receiving a plurality of measured positions from scanning a scene;

receiving a two-dimensional ("2D") image of the scene, the 2D image comprising a plurality of pixels with measured color values of the scene;

generating a three-dimensional ("3D") representation of the scene comprising a plurality of measured data points with positions defined from the plurality of measured positions and with color values defined from the measured color values of a first set of the plurality of pixels that are aligned in the 2D image with the positions defined for the plurality of measured data points in the 3D representation;

selecting an unused pixel from the plurality of pixels with which to splat fill the 3D representation, wherein the unused pixel is not within the first set of pixels, and wherein the measured color values of the unused pixel are not used in defining the color values of a measured data point from the plurality of measured data points;

generating a semi-measured data point for the unused pixel in the 3D representation by deriving a position for the semi-measured data point based on a separation between the unused pixel and one or more pixels of the first set of pixels in the 2D image, and based on the positions of one or more measured data points from the plurality of measured data points that are defined with the measured color values of the one or more pixels; and defining color values of the semi-measured data point based on the measured color values associated with the unused pixel.

* * * * *